Jan. 11, 1966 C. VAN DER LELY 3,228,179
DEVICE FOR LATERALLY DISPLACING CROP LYING ON THE GROUND
Filed Sept. 8, 1964 8 Sheets-Sheet 1

Cornelis van der Lely INVENTOR.
BY
Mason, Mason & Albright
Attys.

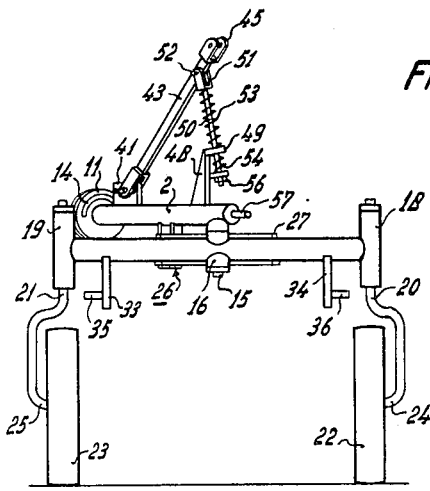
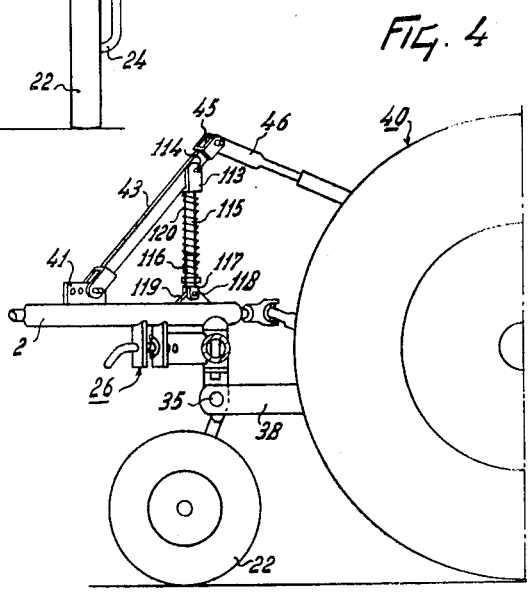
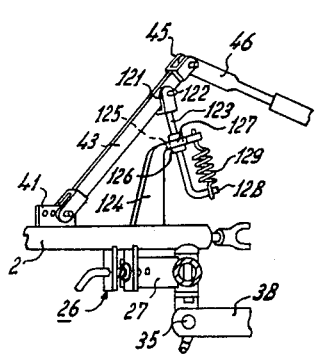

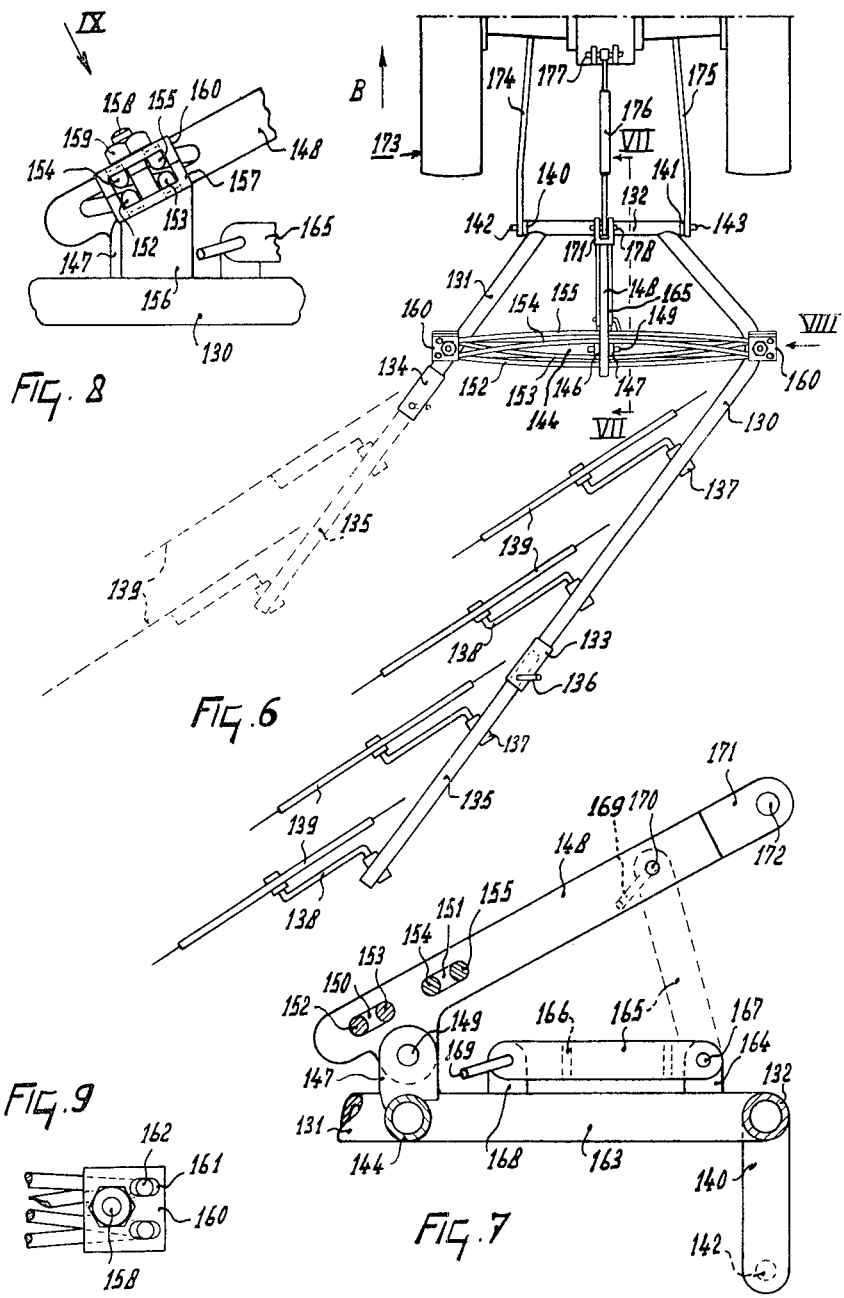

Jan. 11, 1966   C. VAN DER LELY   3,228,179
DEVICE FOR LATERALLY DISPLACING CROP LYING ON THE GROUND
Filed Sept. 8, 1964   8 Sheets-Sheet 4
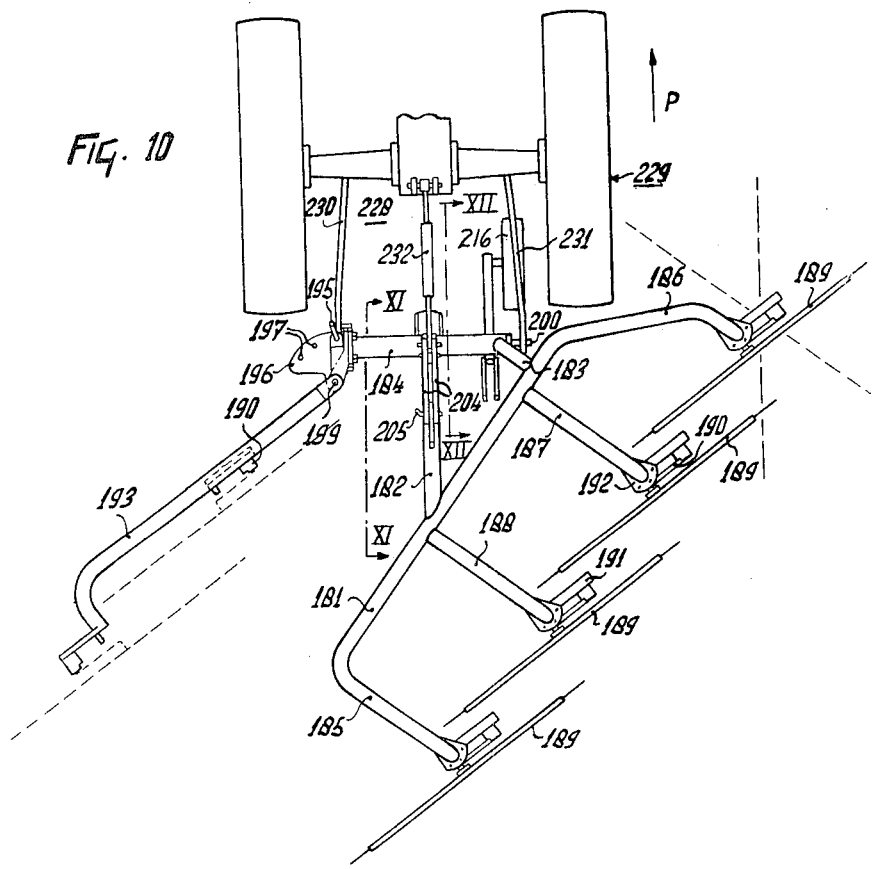
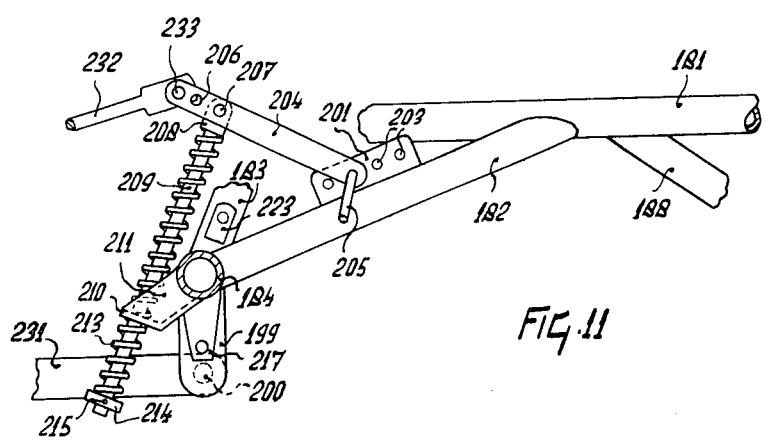
Cornelis van der Lely INVENTOR.
BY Mason, Mason & Albright
Attys.

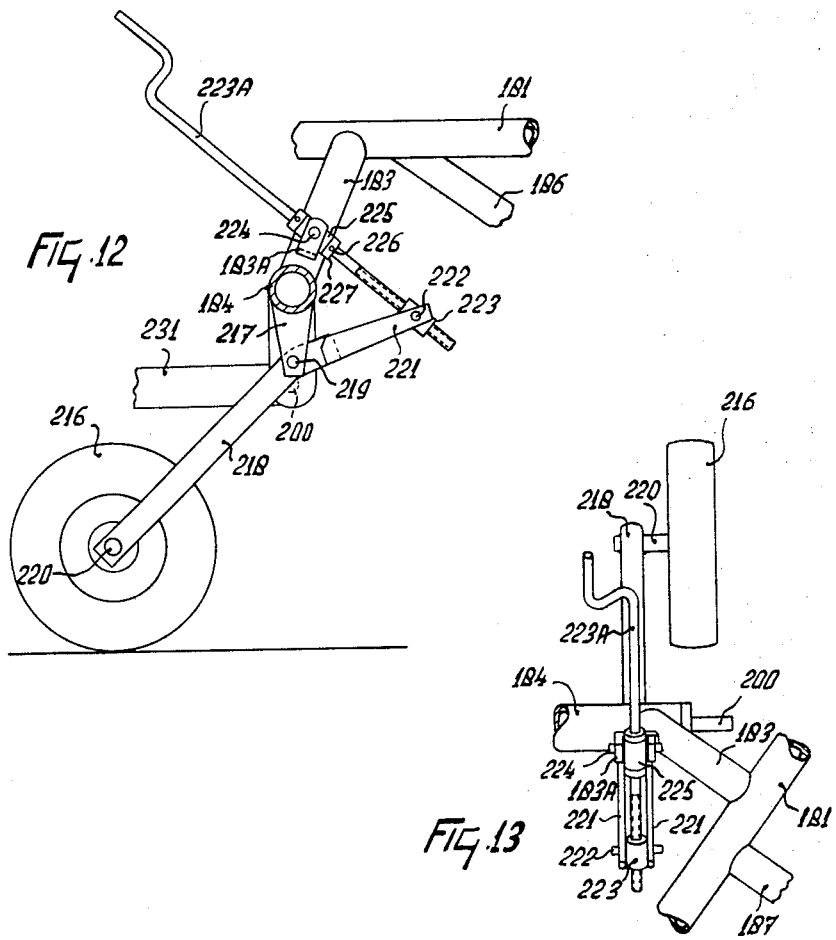

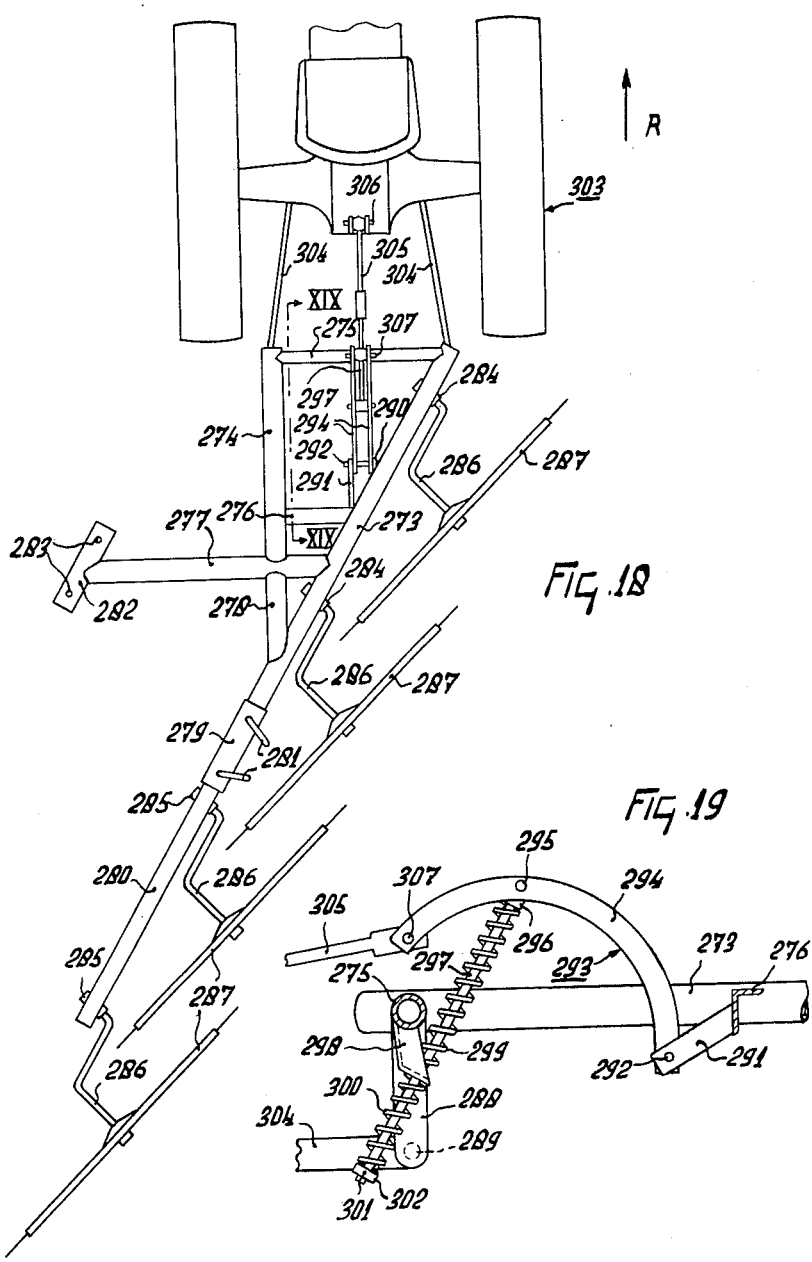

United States Patent Office 3,228,179
Patented Jan. 11, 1966

3,228,179
DEVICE FOR LATERALLY DISPLACING CROP LYING ON THE GROUND
Cornelis van der Lely, Zug, Switzerland, assignor to C. van der Lely N.V., Maasland, Netherlands, a Dutch limited-liability company
Filed Sept. 8, 1964, Ser. No. 396,800
6 Claims. (Cl. 56—377)

This invention relates to a device for laterally displacing crop lying on the ground. This application is a continuation-in-part of application Serial No. 143,800, filed October 9, 1961.

According to the invention the device comprises a frame and at least one raking member, coupled with the frame, and is provided with hitching members by means of which the device can be coupled with a prime mover so as to be pivotable about an at least substantially horizontal pivotal axis, the device being furthermore provided with a hitching member located at a given distance from the pivotal axis, by means of which hitching member the device can also be coupled with the prime mover; in operation the device turning about the pivotal axis, the hitching member moving at least mainly up and down with respect to the pivotal axis, and provision being made of a spring mechanism which counteracts a movement of the hitching member in at least one direction.

In Patent No. 2,896,392, a side delivery raking device is described in which an adjustable yoke means can convert the implement to a tedder or swath turner. A related patent, U.S. 2,988,864, discloses a side delivery rake with a frame and a drawbar. Both patents show rake frames with strips that converge upwardly to a point for connection to the upper element in a three-point lifting device and thus differ from the device disclosed herein. Also, neither prior art device has a connective arm means which is movable in a substantially vertical direction. This connective arm means functions as a "knee action" that permits traverse of the rake over uneven ground.

For a better understanding of the invention and in order to show how the same may be carried into effect, reference will now be made to the accompanying drawing.

FIG. 3 is an enlarged side elevation of the device taken on the line III—III, with the frame portion supporting the rake wheels and the rake wheels being omitted.

FIG. 4 shows a second embodiment of the coupling of the device with the tractor.

FIG. 5 shows a third embodiment of the coupling of the device with the lifting device of the tractor.

FIG. 6 is a plan view of a second embodiment of a device, together with a hitching member, according to the invention, which is coupled with the lifting device of a tractor.

FIG. 7 shows on an enlarged scale, a sectional view of the device shown in FIG. 6, taken on the line VII—VII.

FIG. 8 is an enlarged elevation of part of the device shown in FIG. 6, taken in the direction of the arrow VIII.

FIG. 9 shows part of FIG. 8, taken in the direction of the arrow IX in FIG. 8.

FIG. 10 is a plan view of a third embodiment of a device, together with a hitching member, according to the invention, which is coupled with the lifting device of a tractor.

FIG. 11 shows, on an enlarged scale, a sectional view of part of the device shown in FIG. 10, taken on the line XI—XI in FIG. 10, with the ground wheel supporting the frame being omitted.

FIG. 12 shows on an enlarged scale the fastening of the ground wheel to the frame, taken on the line XII—XII in FIG. 10.

FIG. 13 is a plan view of the fastening shown in FIG. 12.

FIG. 18 is a plan view of a fifth embodiment of a device, together with a hitching member, which is coupled with the lifting device of a tractor.

FIG. 19 shows on an enlarged scale a sectional view taken on the line XIX—XIX in FIG. 18.

Figure 1:
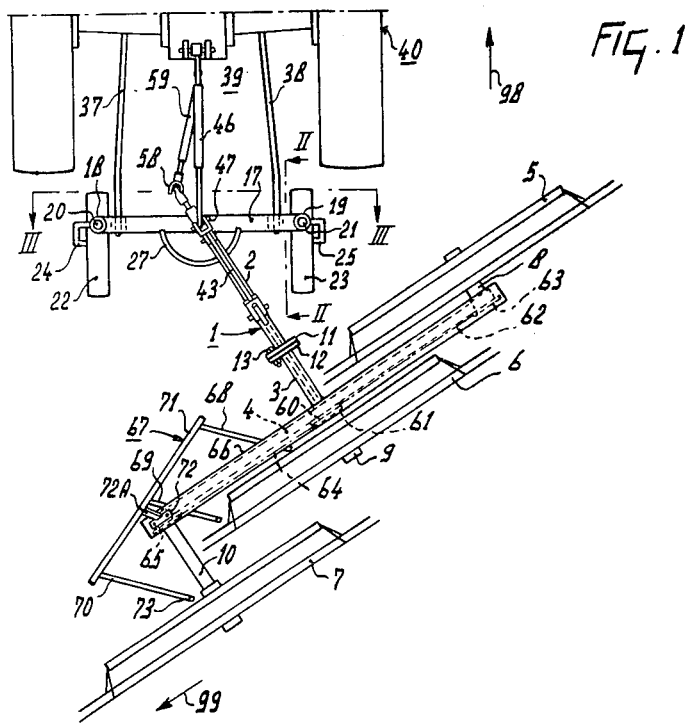
FIG. 1 is a plan view of a device according to the invention, which is coupled with the lifting device of a tractor.
Figure 2:
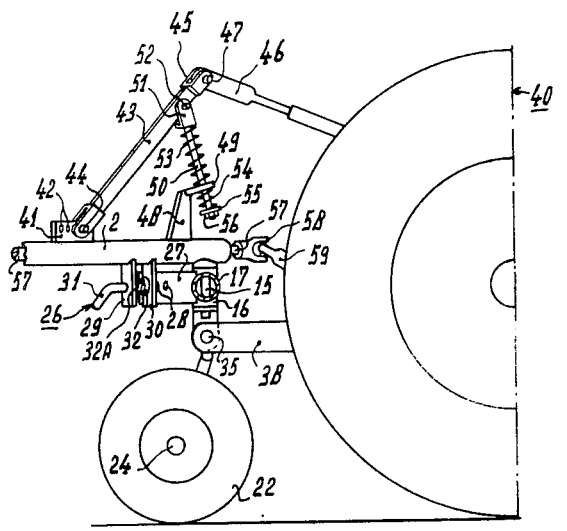
FIG. 2 shows, on an enlarged scale, a sectional view of the device taken on the line II—II in FIG. 1.

The device shown in FIGS. 1 to 3 comprises a frame 1 which has two aligned beams 2 and 3, to the end of the beam 3 being secured a beam 4, which extends transversely to the beam 3. To the beam 4 are secured three rake wheels 5, 6 and 7, which are arranged on shafts 8, 9 and 10, journalled in the frame beam 4. The beam 3, lying in line with the beam 2, is rotatable with respect to the beam 2 and fixable in a plurality of positions. To this end the beams 2 and 3 have secured flanges 11 and 12 to them. The flanges 11 and 12 can be clamped to each other by means of a bolt 13, which is taken through a slot 14 in the flange 11 and a hole in the flange 12 (FIG. 3). The beam 2 is provided at the front end with a shaft 15, pointing vertically downwards from this beam and journalled in a bearing 16, which is provided in a horizontal beam 17. The horizontal beam 17 is provided at its ends with vertical bearings 18 and 19, in which shafts 20 and 21, respectively, are journalled. With the shafts 20 and 21 are connected ground wheels 22 and 23. The shafts 20 and 21 are connected with the axles 24 and 25 of the ground wheels 22 and 23 so that the center lines of the shafts 20 and 21 cross the center lines of the axles 24 and 25, so that the ground wheels 22 and 23 are caster wheels.

As shown in FIGURE 2, a turn of the shaft 15 in the bearing 16 can be prevented by means of a locking member 26, which comprises a curved strip 27, fastened to the beam 17, having a plurality of holes 28 and being arranged concentrically around the shaft 15. The locking member comprises furthermore two tags 29 and 30, which are secured to the beam 2. A locking pin 31 is slidable in its longitudinal direction in holes provided in the tags, so that this pin can be inserted into one of the holes 28. Between the tag 29 and a ring 32 located between the tags and secured to the pin provision is made of a spring 32A, which always tends to displace the locking pin in a direction towards the strip 27.

Between the bearings 18 and 19, on the lower side of the beam 17 provision is made of supports 33 and 34 to which are secured aligned horizontal pins 35 and 36 (FIG. 3).

The beam 2 is provided on the top side with a strip 41, in which a plurality of holes 42 is provided. With the strip 41 is connected a hitching member shaped in the form of an arm 43 so as to be pivotable by means of a pin 44. The arm 43 is provided at the top with a forked portion 45.

The beam 2 is furthermore provided at the top with a tag 48, which supports an eye-shaped member 49. The eye-shaped member 49 is arranged so that its hole lies fairly just above the shaft 15. The hole of the eye-shaped member 49 accommodates a rod 50, which is provided at its top end with a fork-shaped part 51, which is pivoted to the rod 43 by means of a pin 52 at a short distance from the forked portion 45. Between the eyelet 49 and the fork-shaped part 51 the shaft 50 is surrounded by a pressure spring 53. The fork-shaped part 51 constitutes a stop for the spring 53, which stop is pivoted to the arm 43, while the eye 49 constitutes a stop for the spring, which stop is secured to the frame. The part of the rod 50 lying below the eye 49 is surrounded by a pressure spring 54, which bears at the lower end on a ring 55, provided on the shaft 50 and forming a stop for the spring 54. The ring 55 is held on the shaft 50 by a nut 56, by means of which the ring 55 can be shifted along the shaft 50 for adjusting the spring tension.

In the frame beams 2 and 3 is journalled a shaft 57, which is provided at the front end with a coupling member 58. To the end of the shaft 57, journalled in the beam 4 are secured sprocket wheels 60 and 61. The sprocket wheel 60 is linked by a chain 62 to a sprocket wheel 63, which is seated on the shaft 8, with which the rake wheel 5 is coupled. The sprocket wheel 61 is linked with the aid of a chain 64 to a sprocket wheel 65, which is seated on the shaft 10, on which the rake wheel 7 is mounted. The sprocket wheels 60, 61, 63 and 65 and the chains 62 and 64, as well as the beam 4 are accommodated in a casing 66. The chains and the sprocket wheels are therefore shown only diagrammatically in FIG. 1.

On the side of the rake wheels 6 and 7 the casing 66 is provided with a guide member 67, which is formed mainly by three bars 68, 69 and 70, which are connected with each other by a connecting bar 71. The guide member 67 is secured to the casing 66 by means of a support 72, which is secured with the aid of a strip 72A to the connecting bar 71.

The device can be coupled with the lifting device 39 of a tractor 40. To this end the lower arms 37 and 38 of the lifting device are coupled with the pins 35 and 36, whereas the topmost arm 46 is connected by means of the pin 47 with the fork-shaped portion 45. The shaft 57 can be linked to the power-take-off shaft of the tractor with the aid of the coupling 58 and an intermediate shaft 59. The topmost arm 46, which is freely pivotable with respect to the tractor, constitutes a coupler link by means of which the hitching member is coupled with the tractor. When the device moves in the direction of the arrow 98 and when the device occupies the position shown in FIG. 1, the rake wheels 5, 6 and 7 can be driven from the power-take-off shaft of the tractor. The rake wheel 5 is capable of delivering the crop lying on the ground to the left-hand side, the crop thus arriving in front of the rake wheel 6, which displaces the crop supplied by the rake wheel 5 plus the crop lying in front of the wheel 6 itself in common farther to the left, the crop then arriving in front of the rake wheel 7. The rake wheel 7 displaces the crop delivered by the rake wheel 6 plus the crop engaged by this wheel itself farther aside so that the whole quantity of displaced crop is collected in one swath on the left-hand side of the rake wheel 7. In order to ensure a uniform delivery of the material, the guide member 67 is provided.

The rake wheels 5, 6 and 7 are capable of matching the unevennesses of the ground, since the device as a whole is capable of turning with respect to the lifting device of the tractor. The device is pivotable relative to the lever arms 37 and 38 by pivoting about the pins 35 and 36 in the coupler links of the arms 37 and 38, in which the pins 35 and 36 are received. A favorable effect is obtained by means of the spring mechanism formed by the spring 53, which cooperates with the hitching member 43. In operation the tension of the spring is such that at least part of the weight of the frame extending far behind the pivotal axis formed by the pins 35 and 36 is transferred to the arms of the lifting device. The spring constantly tends to displace the hitching member in a direction away from the pivotal axis. If the device tends to pivot downward around the pivotal axis, the tension in the spring 53 is raised, so that this movement is braked resiliently. Owing to the disposition of the various shafts about which the hitching member 43 and the coupler link formed by the lever arm 46, which is freely pivotable relative to the tractor, are adapted to turn, these members occupy a favorable position in which they do not hinder the movements of the device, while they can be readily returned into their initial positions by the spring 53. An abrupt upwards movement of the device is also braked by the spring 54. By displacing the nut 56 the tension of the springs and hence the pressure of the rake wheels on the ground can be adjusted.

The position of the rake wheels 5, 6 and 7 with respect to the traveling direction 98 can be changed by turning the device about the shaft 15. This turn can be performed after the locking pin 31 has been withdrawn from a hole 28, the device then being adapted to turn relative to the beam 17 and the tractor 40. By introducing the pin 31 into a further hole 28, the position of the rake wheels 5, 6 and 7 relative to the traveling direction 98 can be fixed.

FIG. 4 shows a second embodiment for fastening the device to the lifting device of a tractor. The similar parts also used in this embodiment are designated by the same reference numerals. In this embodiment a tube 115 is pivotally coupled with the arm 43 with the aid of a U-shaped bracket 113 and a pin 114. Into the free end of the tube 115 is introduced a tube 116, which is adapted to slide to and fro in the tube 115. To the end of the tube 116 is secured a U-shaped bracket 117, which is pivoted with the aid of a pin 118 to a support 119, secured to the frame beam 2. The tubes 115 and 116 are surrounded by a pressure spring 120. The bracket 113 constitutes a stop for the spring 120, which stop is pivoted to the hitching member 43, whereas the bracket 117 constitutes a stop for the spring 120 which stop is pivoted to the frame. Also in this embodiment the spring 120 tends to move the hitching member 43 and the arm 46 of the lifting device in a direction away from the pivotal axis. The operation of the spring mechanism comprising the spring 120 is otherwise identical to that of the preceding embodiment.

FIG. 5 shows a third embodiment of the fastening of the device to the lifting device of a tractor. Also in this case identical parts of the device are designated by the same reference numerals as in the embodiment shown in FIGS. 1 to 4. With the aid of a bracket 121 and a pin 122 the arm 43 has secured to it an arm shaped in the form of a round bar 123. To the frame beam 2 is secured a support 124, in which a hole 125 is provided. In this hole 125 is accommodated a bearing 126, through which the bar 123 is taken. The bearing 126 is adapted to pivot about a shaft 127 with respect to the bracket 124, the said shaft being at right angles to the longitudinal axis of the arm 123. The end 128 of the bar 123 is bent over and has secured to it a tensile spring 129. The other end of the tensile spring 129 is secured to the support 124. It will be evident that also in this case the tensile spring 129 constitutes a spring mechanism tending to move the hitching member 43 and the arm 46 of the lifting device in a direction away from the pivotal axis, whereas the device is capable of deflecting from its position about the pivotal axis formed by the aligned pins by means of which the device is coupled with the lower arms of the lifting device of the tractor.

FIG. 6 shows a device comprising two frame beams 130 and 131, which are connected with each other by a frame beam 132. To the end of the beam 130 is secured a sleeve 133 and to the end of the frame beam 131 is secured a sleeve 134. Into the sleeve 133 is introduced a frame beam 135, which is fixed in the sleeve 133 with the aid of a locking pin 136. To the frame beams 130 and 135 are secured bearings 137, in which cranks 138 are journalled, which support rake wheels 139. To the frame beam 132 are secured supports 140 and 141, to the ends of which are secured horizontal, aligned pins 142 and 143.

The frame beams 130 and 131 are furthermore connected with each other by a frame beam 144, extending parallel to the beam 132. To the frame beam 144 are secured two supports 146 and 147, between which an arm 148 is arranged, which is pivoted to the supports by means of a pin 149. On either side of the pin 149, which constitutes a pivotal axis for the arm 148, this arm has elongated holes 150 and 151. These slots accommodate spring steel bars 152, 153, 154 and 155, extending transversely to the arm 148.

As shown in FIGURE 8, supports 156 are secured to the frame beams 131 and 130, at the place where the frame beam 144 is secured to them. To the supports 156 are secured U-shaped brackets 157 and with the aid of a bolt 158 and a nut 159 a U-shaped bracket 160 is secured to the U-shaped bracket 157.

The ends of the bars 152, 153, 154 and 155 are located between the U-shaped brackets 157 and 160. In order to hold the bars at their place, the brackets have slots 161 (FIG. 9) in which the bent-over ends of the bars are housed.

The fastening points of the bars to the frame are located at least substantially in line with the pins 149, so that, viewed from above, the bars exhibit a slightly curved course.

Between the frame beam 132 and the frame beam 144 provision is made of a frame beam 163, to which a support 164 is secured. To this support 164 are pivoted two parallel strips 165, which are connected with each other by intermediate pieces 166, with the aid of a pin 167. To the frame beam 163 is secured a second support 168, in which a hole is provided. The strips 165 can be fixed to the support 168 with the aid of a locking pin 169, which can be taken through holes in the ends of the strips 165 and a hole in the support 168. The arm 148 has a further hole 170. The distance between the strips 165 is such that the arm 148 fits between the ends of the strips, so that they may occupy the position shown in FIG. 7 in broken lines and the locking pin 169 can be taken through the holes in the strips and the hole 170, the arm 148 then not being any longer capable of turning relatively to the frame of the device. To the end of the arm 148 is further more secured a U-shaped bracket 171, in which holes 172 are provided.

From FIG. 6 it will be seen that the device can be coupled with the lifting device of a tractor 173. To this end the lower arms 174 and 175 of the lifting device are connected with the pins 142 and 143, whereas the topmost arm 176, which is freely pivotable with respect to the tractor, about a pin 177, is pivoted with the aid of a pin 178 to the U-shaped bracket 171. The lever arm 176 constitutes in this case the coupler link which connects the hitching member 148 with the tractor.

When the device is moved in operation by the tractor in the direction of the arrow B, the rake wheels are set rotating by their contact with the ground or the crop or both. They then deliver the crop in common to the left. The device is capable of pivoting about the pivotal axis formed by the center lines of the pins 142 and 143. Also, the arms 148 and 176 will pivot about the pins 149 and 177. Such a movement is counteracted by the bars 152, 153, 154 and 155, which constitute a resilient mechanism and which tend to move the arm 148, when it moves downwards, back in a direction away from the pivotal axis. When the arm 148 is turned, the bars are partly under stress of bending force and partly under stress of torsional force, so that they tend to reoccupy their initial positions.

The frame beam 135 may be discoupled from the sleeve 133 and be connected with the sleeve 134. Then the frame beam with the rake wheels coupled herewith occupies the position shown in broken lines in FIG. 6. The device then operates as a swath turner. If the device is to be transported over a large distance, while being suspended on the lifting device of the tractor, the arm 148 can be fixed with the aid of the strips 165 and the locking pin 169, forming a fixing member, so that the device will not swing in an undesirable manner during transport. It will be obvious that such a fixing mechanism may also be employed in the embodiments described above.

The frame of the device shown in FIG. 10 comprises a first frame beam 181, extending obliquely to the traveling direction and connected with the aid of struts 182 and 183 with a transverse beam 184. Viewed from above, the strut 182 extends parallel to the traveling direction of the device and is connected approximately at the center with the frame beam 184.

Rake wheels 189 are coupled with the bent-over ends 185 and 186 and with beams 187 and 188 arranged between the said ends. The rake wheels are mounted on cranks 190, journalled in supports 191. The supports 191 are rotatable about vertical axes with respect to the frame and fixable in different positions with the aid of known fixing members 192.

The frame beam 181, located in front of the rake wheels, is located in this embodiment on a higher level than the hubs of the rake wheels and the supports 185, 186, 187 and 188 extend from the frame beam 181 obliquely downwards.

With the end of the transverse beam 184, remote from the frame beam 181, is coupled a further beam 193, which is adapted to turn about a vertical shaft 194. The beam 193 can be fixed against rotation by means of a locking pin 195, secured to the frame beam and introduced into one of the holes 197 in a plate 196, secured to the frame beam 184. To the beam 193 are secured bearings 198, so that rake wheels can be coupled with the frame beam, as is shown in broken lines.

To the ends of the frame beam 184 are secured with the aid of plates 199 aligned, horizontal pins 200. To the frame beam 182 is secured a vertical strip 201, which is provided with a plurality of holes 203. On each side of the strip 201 arms 204 are arranged, which are hinged to the strip 201 with the aid of a pin 205. The free ends of the arms 204 are provided with a plurality of holes 206. Through one of these holes 206 is taken a pin 207, by means of which a plate 208 is hinged to the arms 204. To the plate 208 is secured a bar 209, which is taken through a hole in the bent-over end 210 of a support 211, secured to the frame beam 184. The bar 209 is surrounded by a spring 212, one end of which bears on the bent-over end 210 and the other end of which bears on the plate 208.

The end of the bar 209 projected below the support 211 is surrounded by a spring 213, which is enclosed between the support 211 and a ring 214, secured to the end of the bar. This ring 214 is secured to the bar with the aid of a pin 215.

The frame of the device furthermore comprises a ground wheel 216 (FIG. 12). To this end the frame beam 184 has secured to it a support 217, to which is pivoted a lever 218 with the aid of a horizontal shaft 219. To one end of the lever 218 is secured a horizontal axle 220, about which the ground wheel is rotatable. To the other end of the lever 218 are secured arms 221, between which a block 223 is arranged with the aid of a pivotal shaft 222. The block 223 has a tapped hole, into which is screwed the screw-threaded end of a screw spindle 223A. To the frame beam 184 is secured a U-shaped support 183A, in which a block 225 is pivotably arranged with the aid of a horizontal shaft 224. The block 225 has a hole, through which the screw spindle is taken. On either side of the block 225 rings 227 are provided with the aid of pins 226 rigidly fixed on the screw spindle 222. The screw spindle is thus capable of turning in the block 225, but it is not slidable in its longitudinal direction in the block 225.

From the figures it will be seen that the device can be coupled with the lifting device 228 of a tractor 229. To this end the lower arms 230 and 231 of the lifting device are connected with the pins 200, whereas the topmost arm 232 of the lifting device is hinged with the aid of a pin 223 to the arms 204, constituting a hitching member.

The device operates as follows:

When the device is moved in the direction of the arrow P, and when the rake wheels occupy the position shown in full lines, the device operates as a side-delivery rake.

The rake wheels coupled with the frame beam 181 can be turned into a position in which they are at least substantially at right angles thereto, which is illustrated in broken lines for the foremost rake wheel. In this position, the rake wheels work each strip of ground during the travel of the device, which thus operates as a tedder.

At least the foremost rake wheel can be moved also into a position in which it is at least substantially parallel to the traveling direction of the device, which is also shown in broken lines. In this position the device can be suitably transported.

The ground wheel 216 determines the distance between the lower arms of the lifting device and the ground during operation and hence the pressure of the rake wheels on the ground. This distance may be varied by displacing the ground wheel 216 with the aid of the screw spindle 223A in the direction of height with respect to the frame. This arrangement of the ground wheel has the advantage that, when the device is lifted, for example for turning through a bend, with the aid of the lifting device and when the device is afterward lowered again, the rake wheels automatically bear with the same pressure on the ground as during the preceding course. From FIGURE 10 it will furthermore be seen that the ground wheel is located on one side of the pivotal axis formed by the pins 200, whereas the rake wheels are located on the other side. It is thus ensured that, when the frame tends to move upwards on the rear side, for example in forming a large swath, the ground wheel is pressed against the ground and thus counteracts the said movement. When the frame beam 193 is secured to the plate 196, the device may be employed as a swath turner by coupling two of the rake wheels as shown in broken lines on the frame beam 193 so that the device comprises two groups of rake wheels, each group working an individual strip of land. Since the arms 204, which are coupled with the topmost arm of the lifting device, are adapted to pivot freely relatively to the frame, and a spring mechanism formed by the spring 212 is provided, which tends to hold the arms 204 at a given distance from the lower coupling points 200, an efficient resilient support for the frame is obtained. In operation the frame is capable of pivoting freely around the pins 200, by means of which the device is coupled with the lower arms of the lifting device. If the rear part of the device moves downwards, the spring 212 is compressed, so that it counteracts the said movement. It is advantageous that the arms 204, connected with the device so as to be freely pivotable, and the arm 232, connected with the tractor so as to be freely pivotable, extend obliquely upwards. The spring 213 brakes an abrupt upward movement of the hindmost part of the device with respect to the arms of the lifting device. The rake wheels, mounted on cranks, may also be supported with the aid of springs.

Figure 14:
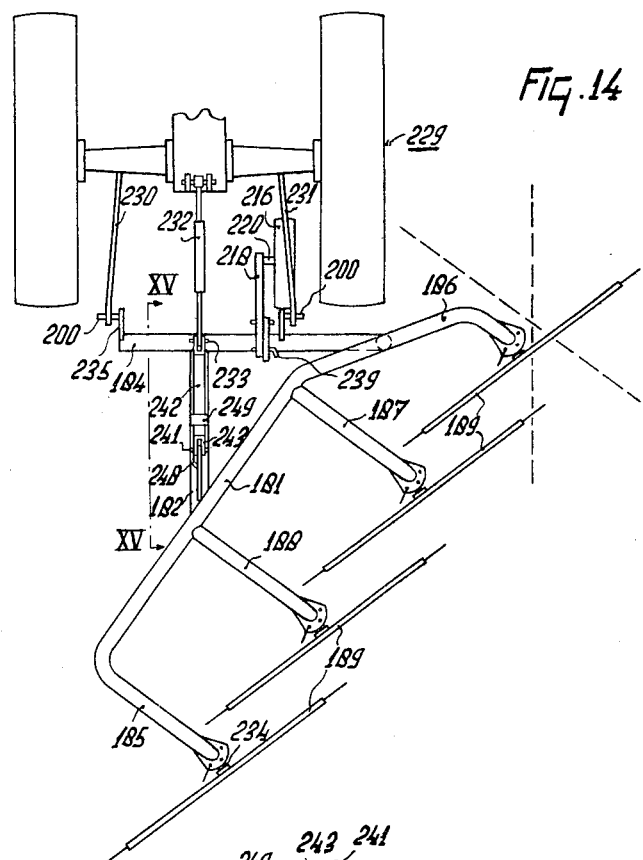
FIG. 14 is a plan view of a fourth embodiment of a device, together with a hitching member, according to the invention, which is coupled with the lifting device of a tractor.
Figure 15:
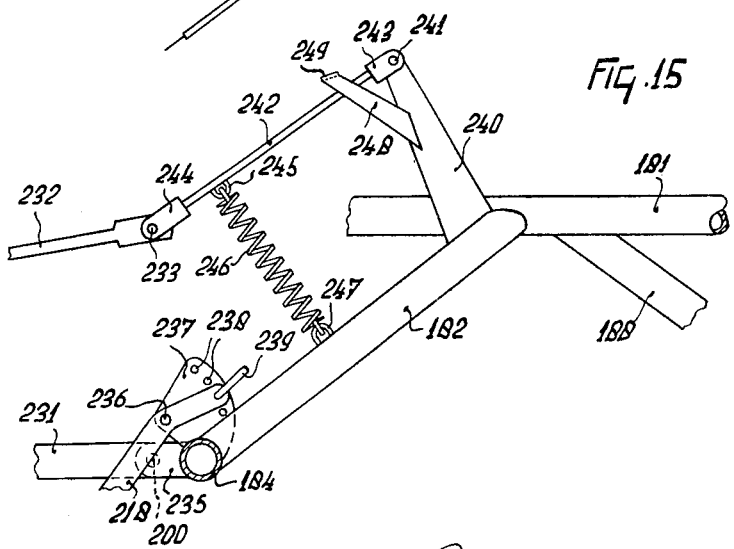
FIG. 15 shows on an enlarged scale the fastening of the device to the lifting device of a tractor, taken on the line XV—XV in FIG. 14, with the rake wheels and the ground wheel being omitted.

The device shown in FIGS. 14 and 15 corresponds at least mainly with the device shown in FIG. 10 and corresponding parts are denoted by the same reference numerals. The rake wheels 189, however, are coupled with the frame not with the aid of cranks but by means of horizontal shafts 234.

The frame beam 184 is prolonged and its end is secured to the part 186 of the frame beam 181. The pins 200 are secured to the plates 235, projecting to the front from the beam 184. The lever 218 is rotatably connected, with the aid of a shaft 236, with a plate 237, secured to the frame beam 184 (FIG. 15). The plate 237 has a plurality of holes 238. With the aid of a locking pin 239, which can be taken through one of the holes 238 and a hole of the lever, this lever can be fixed in different positions, so that the height of the ground wheel is adjustable. To the frame beam 182 is secured an arm 240, projecting obliquely upwards and forwards. With the aid of a pin 241 the arm 240 has hinged to it a bracket 243, secured to the end of an arm 242. Near the bracket 244 an eye 245 is secured to the arm 242. To this eye is connected one end of a tensile spring 246, of which the other end is coupled with an eye 247, secured to the beam 182. To the arm 240 is furthermore secured a strip 248, the end 249 of which is bent over and is located above the arm 242.

The device can be coupled with the lifting device of a tractor by connecting the lower arms 230 and 231 of the lifting device of the tractor 229 with the pins 200, forming the hitching member, whereas the topmost arm 232, freely pivotable with respect to the tractor, is coupled with the aid of a pin 233 with a bracket 244, secured to the arm 242, which constitutes a further hitching member.

From the figure it will be seen that the connection between the arm 242 and the topmost arm 232 of the lifting device is located on a lower level than the connection between the arm 242 and the frame. The coupling point of the arm 232 of the lifting device with the tractor is located on a lower level than the point where the arm 242 is coupled with the arm 232. Like the device in the embodiment described above, the device concerned can be used as a side-delivery rake and as a tedder.

In operation the device is capable of turning about the pivotal axis formed by the center lines of the pins 200 with respect to the tractor. When the rear end of the tractor moves upwards in operation, the ground wheel is urged more tightly against the ground, so that the said movement is counteracted. If the rear end of the device moves downwards, the tensile spring 246 is stretched, so that this spring 246 counteracts this movement and tends to move the device back into its initial position. When the topmost arm of the lifting device and the arm 242 are in line with each other, the device cannot move further downward. In this position the arm 242 comes into contact with the end 249 of the strip 248. The end 249 constitutes a stop, which prevents the arm 242 from turning on in upward direction.

Figure 16:
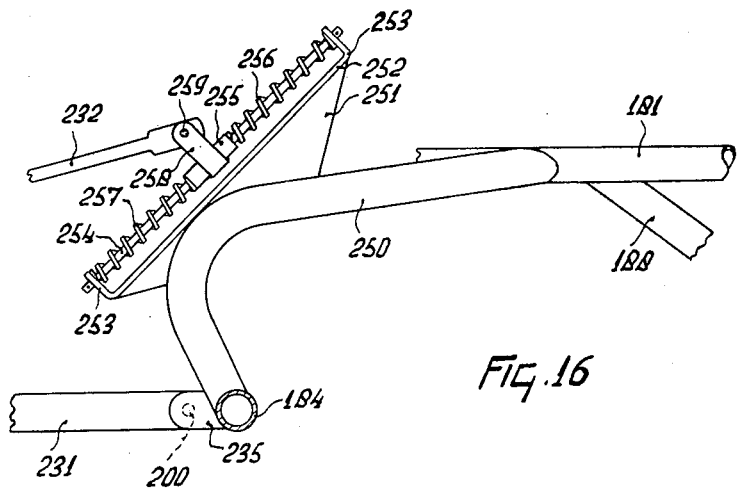
FIG. 16 shows a further embodiment of the fastening of a device according to the invention to the lifting device of a tractor.

A further embodiment of the fastening of the device of the kind described above to the tractor is shown in detail in FIG. 16. In this embodiment the frame beam 182, extending obliquely upwards, is replaced by a curved frame beam 250, to which a U-shaped bracket 252 is secured by means of supports 251. In the limbs 253 of the U-shaped bracket 252 is journalled a shaft 254, which extends, viewed from the side, from the front side of the device obliquely rearwards and upwards, whereas, viewed from above, it is at least substantially parallel to the traveling direction of the device. The shaft 254 is taken through a hole in a block 255, on either side of which a spring 256 and a spring 257, respectively, are arranged. The block 255 can be displaced along the shaft 254 which constitutes a guide for this block and the springs 256 and 257 tend to hold the block in a central position. To the block is secured a U-shaped bracket 258, the limbs of which, each lying on one side of the block are provided with holes for accommodating a pin 259. The further parts of the frame and the arms of the lifting device of the tractor, which are similar to the parts described above, are designated by the same reference numerals.

The device can be coupled with the lifting device of a tractor, by coupling the lowermost arms of the lifting device with the pins 200, whereas the topmost arm 232 of the lifting device is coupled, with the aid of the pin 259, with the bracket 258, secured to the block 255, constituting a hitching member. In operation the device is capable of turning with respect to the tractor about the pivotal axis formed by the center lines of the pins 200. The springs tend to hold the hitching member formed by the block in the position shown in the figure. If the end of the device turns downwards with respect to the tractor, the spring 257, lying underneath the block, is loaded, so that it tends to move the device back into its initial position. However, if the device turns about the pivotal axis in upward direction, the spring 256 is loaded, which also tends to move the device back into its initial position.

Figure 17:
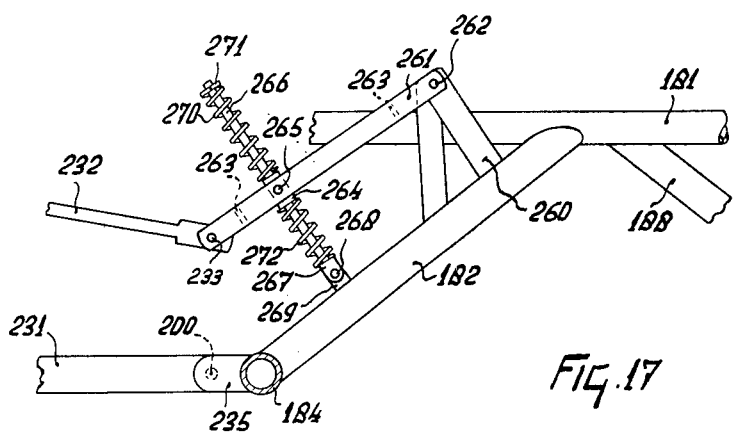
FIG. 17 shows a further embodiment of this fastening of the device according to the invention to the lifting device of a tractor.

In the embodiment shown in FIG. 17 the frame beam 182, extending obliquely upwards has secured to it a support 260, to which are hinged parallel bars 261, which are spaced apart from each other by a given distance and which constitute an arm, to which end use is made of a pin 262. The bars are connected with each other by means of plates 263, arranged in between the bars, while a block 264 is furthermore arranged between the bars 261. This block is capable of performing a pivotal movement about an at least substantially horizontal shaft 265, extending at right angles to the bars with respect to the arm. The block 264 has a hole, through which is taken a rod 266, to the end of which is secured a bracket 267, which is pivoted with the aid of a pin 268 to a support 269, secured to the frame beam 182. On the side of the arm 261, remote from the frame beam 182, the rod 266 is surrounded by a spring 270, which is enclosed between the block 264 and a ring 271, secured to the rod 266. The rod 266 is furthermore surrounded by a spring 272, which is enclosed between the block 264 and the bracket 267. Also in this case the various parts corresponding with those of the embodiment shown in FIGS. 14 and 15 are designated by the same reference numerals.

The device can again be coupled with the lifting device of a tractor by coupling the lowermost arms of the lifting device with the pins 200, secured to the frame beam 184, whereas the topmost arm 232 of the lifting device is coupled with the aid of a pin 233 with the arm 261.

From the figure it will appear that in this embodiment the pivotal point between the hitching member formed by the arm 261 and the topmost arm 232 of the lifting device is located on a lower level than the point where the arm 232 of the lifting device is coupled with the tractor and the point where the arm 261 is secured to the device.

If in operation the device turns downwards about the pivotal axis formed by the center lines of the pins 200, the spring 270 is compressed, so that it tends to move the arm 261 back into the position shown in the figure, so that the device will re-occupy its initial position. If the device turns upwards, the spring 272 is compressed, so that it counteracts the movement of the device with respect to the tractor and tends to move the device back into its initial position. Also in this case an efficient resilient support of the frame is obtained.

FIG. 18 shows a device which comprises a frame beam 273 extending obliquely to the traveling direction and a frame beam 274, extending parallel to the traveling direction. The ends of these frame beams are connected with each other by a frame beam 275 and at a given distance from the beam 275 they are connected by a beam 276. To the frame beam 273 is furthermore secured a beam 277, which extends at right angles to the traveling direction and which is also connected with the frame beam 274. The connection between the frame beam 273 and the frame beam 277 is stiffened by a beam 278, extending in line with the frame beam 274.

To the end of the beam 273 is secured a sleeve 279, in which a frame beam 280 is secured, which is in line with the beam 273, by means of locking pins 281. To the free end of the beam 277 is secured a sleeve 282, in which holes 283 are provided. To the beam 273 are secured two bearings 284 and to the beam 280 are secured two bearings 285. In the bearings are journalled cranks 286, on the ends of which rake wheels 287 are rotatably mounted.

To the ends of the frame beams 273 and 274 are secured vertical supports 288, to which pins 289 are secured (FIG. 19). To the frame beams 273 and 276 are secured parallel strips 290 and 291, in which a pin 292 is journalled. With the aid of the pin 292 a hitching member formed by an arm 293 is coupled with the frame of the device. The arm 293 has two curved strips 294, lying in a vertical plane. At a given distance from the free end of the arm 293 a block 296 is pivoted to the arm with the aid of a pin 295. To the block 296 is secured a bar 297, which is guided through a hole provided in a support 298, attached on the beam 275; this hole constitutes a bearing for the bar, in which the bar can slide freely to and fro. The part of the bar located between the support 298 and the block 296 is surrounded by a spring 299 and the part of the bar projecting below the support 298 is surrounded by a spring 300, which is enclosed between the support 298 and a ring 302, secured to the bar by means of a pin 301.

The device can be coupled with the lifting device of a tractor 303 by coupling the hitching member formed by the pins 289 with the lowermost arms 304 of the lifting device. The topmost arm 305 of the lifting device, which is coupled with the aid of a pin 306 so as to be freely pivotable with respect to the tractor, can be pivoted with the aid of a pin 307 to the end of the arm 293, which constitutes a hitching member.

When the device is moved in operation by the tractor in the direction of the arrow R and when the rake wheels occupy the position shown in the figure, the rake wheels displace the crop in common to one side, so that the device constitutes a side-delivery rake. In operation the device is capable of swinging with respect to the tractor about the pivotal axis formed by the pins 289. A turn of the frame of the device with respect to the tractor is inhibited by the springs, which tend to move the device back into initial position.

Owing to the curved shape of the arm 293 the point of application of the spring at the arm is located at a higher level than the coupling point of the arm with the frame and the coupling point of the arm with the lifting device, whereas the last-mentioned coupling point is located on a higher level than the first-mentioned coupling point. The coupling point of the arm 305 with the tractor is located on a lower level than the pin 307 in the normal position of the device.

Owing to the curved shape of the hitching member 293 the springs 299 and 300 have more space at their disposal and the arm 293 can yet be coupled with the frame in a simple manner and the arm 293 and the arm 305 of the lifting device can occupy a favorable position to permit the movements of the device with respect to the tractor.

The structure described above may be employed very successfully with a low-level frame, as is the case in the device shown, in which the frame is located at least substantially on the level of the hubs of the rake wheels.

The device shown in FIG. 18 may, moreover, be employed as a swath turner, to which end the beam 280 can be removed from the sleeve 279 and can be fixed with the aid of the locking pins 281 in the sleeve 282.

With all the structures described above the coupling member moves up and down, when the device performs a pivotal movement in operation with respect to the tractor. This means that the component of movement of the end of the coupling member connected with the tractor, measured in a vertical sense, is at least half of the component of the movement measured in a horizontal direction. The two components are preferably approximately equal to each other.

What I claim is:

1. A device for laterally displacing crop lying on the ground which comprises a frame, a raking member coupled to said frame, a hitching member included in said frame for coupling said device with a prime mover, said hitching member including substantially aligned horizontal pivot means disposed transversely to the normal direction of travel of said device, a connective arm also included in said hitching member disposed above said pivot means, said connective arm movably interconnected at one end to said frame, the other end of said arm being movable substantially vertically relative to said pivot means and said frame and including means for articulated connection to said prime mover, a resilient member associated with said connective arm means and said frame for opposing the vertical movements of said connective arm relative to said pivot means in at least one direction, a second resilient member associated with said connective arm, said second member counteracting a movement of the connective arm in a direction opposite to the direction which is counteracted by the said first resilient member.

2. A device as claimed in claim 1, wherein a bar is pivotally coupled to said connective arm, said bar being taken through a hole in a stop secured to the frame, said bar being surrounded on both sides of the stop by springs forming said resilient members.

3. A device for laterally displacing crop lying on the ground which comprises a frame, a raking member connected to said frame, a hitching member included in said frame for coupling with the three-point lifting elements of a tractor, said hitching member including substantially aligned horizontal pivot means for connection to the lower two elements of said lifting elements disposed transversely to the normal direction of travel of said device, a connective arm also included in said hitching member and disposed above said pivot means, said connective arm movably interconnected at one end to said frame rearwardly relative to said pivot means, the other end of said arm being movable substantially vertically relative to said pivot means and said frame and directly coupled to the upper of said lifting elements, a resilient member associated with said connective arm and said frame for opposing the vertical movements of said connective arm relative to said pivot means in at least one direction, said resilient member being associated with said arm intermediate the ends thereof whereby the vertical movements of said other end of said arm is at least equal to the horizontal movements thereof.

4. A device as claimed in claim 3, wherein said resilient member comprises at least one spring steel rod which extends transversely to a plane in which said connective arm is movable with respect to said plane, said spring steel rod being operatively associated with said connective arm and with said frame.

5. A device as claimed in claim 4, wherein the rod extends on either side of said connective arm, the ends of said rod being attached to the frame.

6. A device as claimed in claim 3, wherein a bar is pivotally coupled to the frame, said bar being taken through a hole in a bearing which is pivotally coupled to said connective arm, said bar being surrounded on both sides of said connective arm by springs forming said resilient members.

References Cited by the Examiner

UNITED STATES PATENTS

| | | | |
|---|---|---|---|
| 2,405,980 | 8/1946 | Sands et al. | 172—439 X |
| 2,896,392 | 7/1959 | van der Lely | 56—377 |

FOREIGN PATENTS

| | | |
|---|---|---|
| 81,575 | 7/1956 | Denmark. |
| 781,692 | 8/1957 | Great Britain. |

ABRAHAM G. STONE, *Primary Examiner.*

RUSSELL R. KINSEY, ANTONIO F. GUIDA,
*Examiners.*

MICHAEL C. PAYDEN, *Assistant Examiner.*